United States Patent [19]
Kim

[11] Patent Number: 5,771,589
[45] Date of Patent: Jun. 30, 1998

[54] SAFETY RAZOR BLADE TOOL

[75] Inventor: Jisu Kim, New York, N.Y.

[73] Assignee: Tritec International Corporation, New York, N.Y.

[21] Appl. No.: 582,388

[22] Filed: Jan. 3, 1996

[51] Int. Cl.$^6$ .............................. B26B 21/54; B26B 21/60
[52] U.S. Cl. ..................................... 30/346.58; 30/346.53; 76/104.1; 76/DIG. 8
[58] Field of Search ........................... 30/346.53, 346.58, 30/346.6, 346.61, 169, 342; 76/DIG. 8, 104.1; 15/236.02

[56] References Cited

U.S. PATENT DOCUMENTS

| | | | |
|---|---|---|---|
| 3,413,720 | 12/1968 | Mullen | 30/526 X |
| 4,059,891 | 11/1977 | Panagiotoulis . | |
| 4,619,799 | 10/1986 | Teerling | 264/101 |
| 4,969,300 | 11/1990 | Blank et al. | 30/169 |

Primary Examiner—Douglas D. Watts
Attorney, Agent, or Firm—Brumbaugh,Graves, Donohue & Raymond

[57] ABSTRACT

A safety razor blade tool includes a substantially rectangular safety razor blade having a cutting edge and an opposing non-cutting edge, and a rubberized thermoplastic protective cover fixedly attached to the non-cutting edge. The protective cover has an extruded substantially rigid inner layer of thermoplastic material and a coextruded thermoplastic rubber outer layer. Such an improved safety razor blade tool may be produced by providing a blade having a cutting edge and a non-cutting edge, feeding a substantially rigid thermoplastic in a viscous state to a coextrusion die, simultaneously feeding a thermoplastic rubber compatible with the substantially rigid thermoplastic in a viscous state to the same coextrusion die, coextruding the substantially rigid thermoplastic and the compatible thermoplastic rubber to form a one-piece coextruded protective cover having an inner layer of the substantially rigid thermoplastic and an outer layer of the compatible thermoplastic rubber, and fixedly attaching the coextruded one-piece protective cover to the non-cutting edge of the blade.

12 Claims, 3 Drawing Sheets

SAFETY RAZOR BLADE TOOL

BACKGROUND OF THE INVENTION

The present invention is directed to a disposable, single-edged safety razor blade of the type having a cutting edge and an opposing, blunt non-cutting edge and, more particularly, to an improved safety razor blade tool having a "rubberized," slip-resistant protective cover over the non-cutting edge to allow for a more comfortable and secure grip of the safety razor blade when used as a cutting tool.

Referring to FIG. 1, there is shown a disposable, single-edged safety razor blade 15 that was originally developed for shaving. The blade 15 is substantially rectangular and has a lengthwise cutting edge 16 and an opposing non-cutting edge 17. A thin metal strip 18, coextensive with the length of the blade, is wrapped around the non-cutting edge 17 and crimped in place to serve as a protective cover for the non-cutting edge. This strip 18 also provides a thicker profile for easier handling and holding of the blade 15 by a user.

While single-edged disposable razor blades have long been supplanted for shaving purposes by more modern razor blades and disposable razors, such blades have found widespread use as general purpose, low cost, disposable, light-duty cutting tools. For example, people use the safety razor blades for scraping paint from glass, for cutting sheets of paper and other materials, etc.

However, because the blade of FIG. 1 was not originally designed as a general purpose cutting tool, the metal strip 18 does not provide a user with a sufficiently good grip to be useful for many types of cutting applications, particularly where a user's fingers are sweaty or greasy.

Although blade holders of various designs for the type of blade shown in FIG. 1, which provide a good grip for cutting are known and available, most users prefer to use the blade without a holder by grasping the metal strip 18 during use. Accordingly, it would be desirable to provide the disposable, single-edged razor blade of the type shown in FIG. 1 with a protective cover for the non-cutting edge that provides a more secure grip to improve the effectiveness of the blade as a general purpose cutting tool.

SUMMARY OF THE INVENTION

In accordance with the present invention which in one aspect is a substantially rectangular safety razor blade tool comprising a substantially rectangular safety razor blade having a cutting edge and an opposing non-cutting edge, and a permanently attached rigid thermoplastic protective cover for the non-cutting edge having a coextruded thermoplastic rubber layer on the exposed surface of the protective cover. The protective cover is wrapped around the non-cutting edge and is substantially coextensive with the length of the non-cutting edge.

Another aspect of the present invention is a method for producing a disposable, single-edged improved safety razor blade tool. First, a substantially rigid thermoplastic in a viscous state is fed to a substantially "U" shaped coextrusion die. At the same time, a thermoplastic rubber compatible with the substantially rigid thermoplastic in a viscous state is fed to the same coextrusion die. The substantially rigid thermoplastic and the compatible thermoplastic rubber are then coextruded to form an elongated protective cover having a substantially "U" shaped cross-section and a substantially rigid thermoplastic inner layer and a compatible thermoplastic rubber outer layer. It is preferable to provide a protective cover having a groove sized to suitably fit over the non-cutting edge of the blade. A piece of the protective cover is then cut to a length substantially equal to the length of the non-cutting edge of the blade and fitted over the non-cutting edge of the blade so as to substantially cover the non-cutting edge. Finally, the piece of the slotted protective cover is fixedly attached to the blade.

BRIEF DESCRIPTION OF THE DRAWINGS

The invention will be better understood from the following detailed description of an exemplary embodiment thereof in conjunction with the accompanying drawings in which.

DETAILED DESCRIPTION OF THE INVENTION

Figure 1:
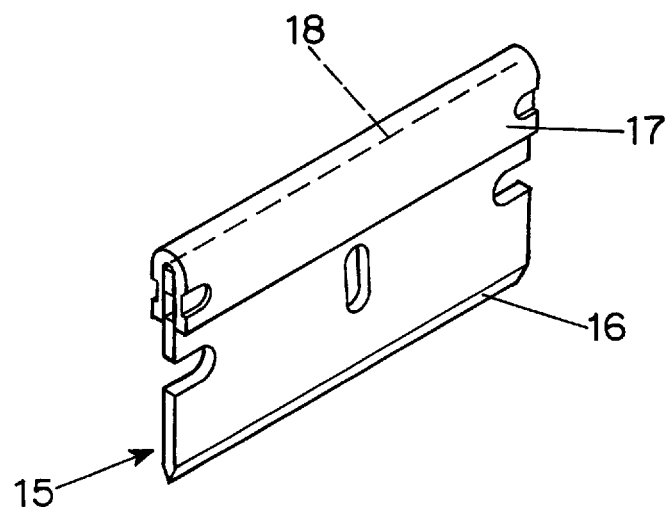
FIG. 1 is an isometric view of a prior art safety razor blade.
Figure 2:
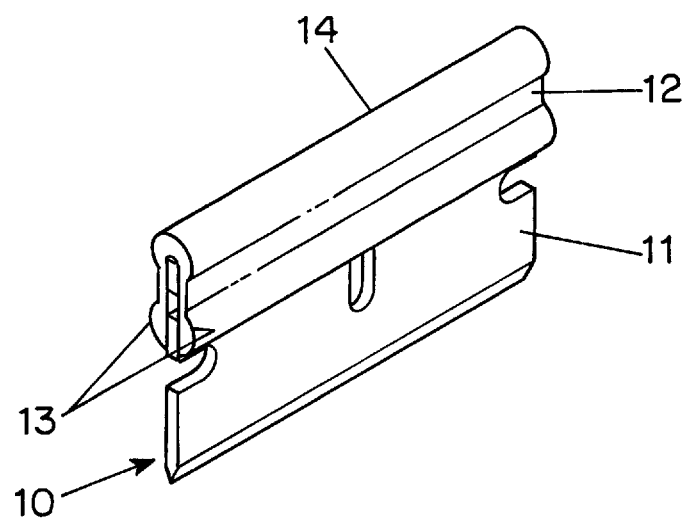
FIG. 2 is an isometric view of an exemplary safety razor blade tool having a rubberized protective cover for the non-cutting edge in accordance with the present invention.

Referring to FIG. 2, there is shown an exemplary safety razor blade tool 10 in accordance with the invention. The razor blade tool 10 includes a blade 11 fixedly attached to a rubberized protective cover 12, which is substantially coextensive in length with the length of the blade. The protective cover 12 has a substantially "U" shaped cross-section and longitudinal semi-cylindrical beads 13 that extend along each edge as well as a longitudinal cylindrical crown 14 along the top of the protective cover 12.

Figure 3:
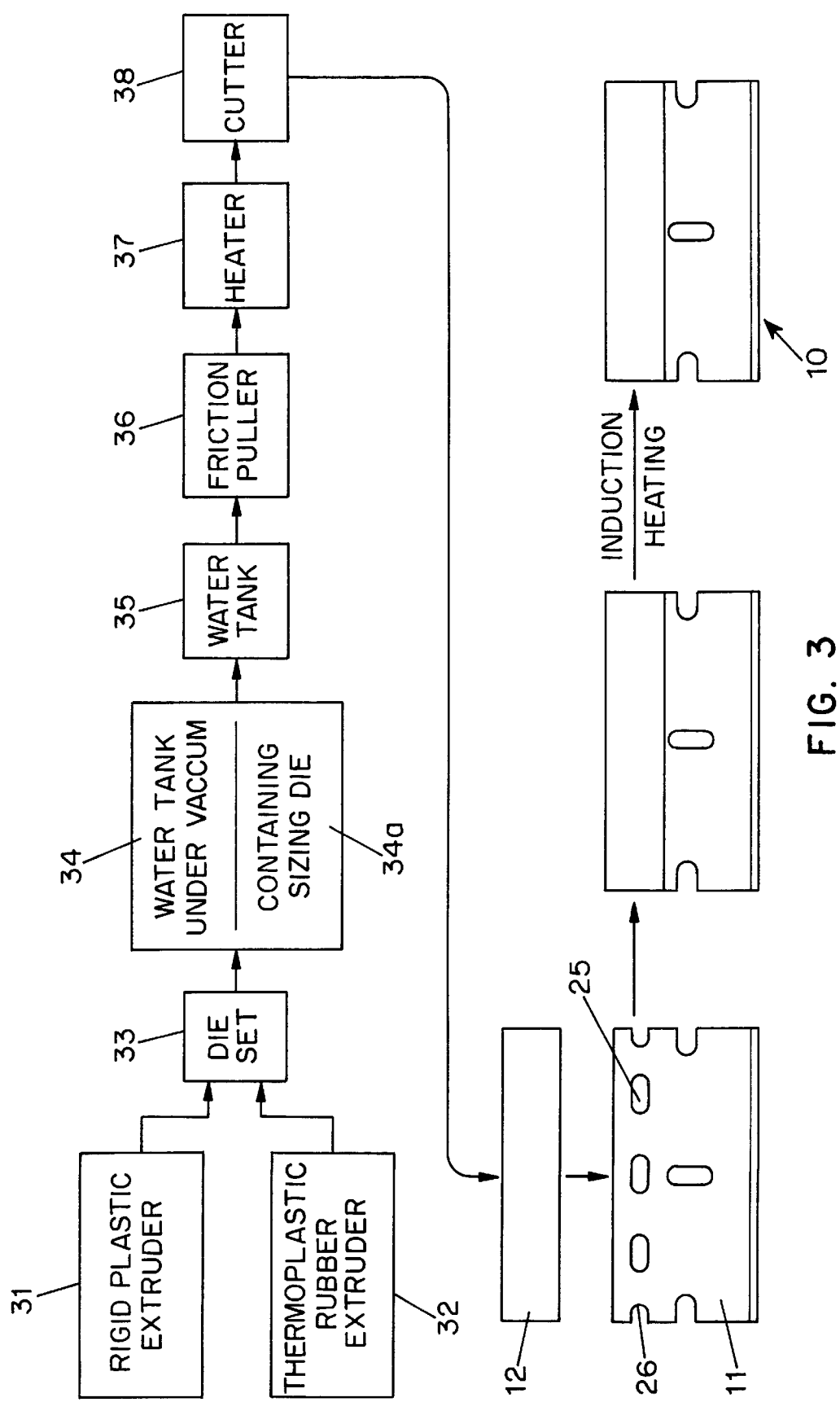
FIG. 3 is a schematic block diagram illustrative of an exemplary process, in accordance with the invention for fabricating the safety razor blade tool of FIG. 2.

Turning now to FIG. 3, the rubberized protective cover 12 has a rigid thermoplastic inner layer 20 covered by a relatively thin, flexible outer layer 21 of coextruded thermoplastic rubber. Advantageously, the rubberized protective cover 12 is extruded to have longitudinal grooves or fluting, and a suitable width for easy grasp of the blade by the user. Those skilled in the art will recognize that suitable dimensions of the rubberized protective cover 12 may vary over an appropriate range suitable to its usefulness as a general purpose cutting tool, and also suitable for use in available blade holders.

Suitable thermoplastic materials for forming the rigid layer 20 of the rubberized protective cover 12 include polyolefins (such as high density polyethylene and polypropylene), and polyvinyl chloride. In the exemplary embodiment the thermoplastic material for forming the rigid layer 20 of the rubberized protective cover 12 is polypropylene having a melt flow index of 1.2 g/10 minutes as measured according to the American Society of Testing Materials method D 1238.

The thermoplastic rubber layer 21 on the rubberized protective cover 12 has a suitable thickness capable of being formed by the coextrusion process described herein, and which provides a more comfortable grip with a soft, non-slippery feel. The thermoplastic rubber material of the outer layer 21 for the protective cover 12 must be coextrudable with the thermoplastic of the rigid inner layer 20 and have good and stable adhesion after the coextrusion process.

In order for the thermoplastic layer material and thermoplastic rubber material to produce workable coextrudates, they should have suitable flow viscosities while passing through the coextrusion die. For good adhesion, molecules of each material must mix and interweave to form a strong bond at the interface between the inner layer 20 and the thermoplastic rubber outer layer 21.

As is well known to those skilled in the art, if the materials chosen for the thermoplastic inner layer 20 and the thermoplastic rubber outer layer 21 do not mix and interweave to a sufficient extent at the interface to provide good adhesion, an appropriate tie layer (not shown) may be formed between the layer 20 and the thermoplastic rubber layer 21 using an appropriate three-layer coextrusion die. In this manner, a rigid thermoplastic layer material and a thermoplastic rubber material which are otherwise incompatible for forming the coextruded protective cover, in accordance with the invention, may be made compatible using a tie layer.

Compatible thermoplastic rubber outer layer and thermoplastic inner layer material combinations include the ethylene-propylene-diene monomer rubber, such as Sarlink sold by DSM Thermoplastic Elastomers of Leominster, Mass., and a polypropylene, such as Stamylan sold by DSM Engineering Plastics of Evansville, Ind. In the exemplary embodiment, the thermoplastic rubber material for the outer layer 21 is Sarlink 3160 and the rigid thermoplastic material for the inner layer 20 is Stamylan 13E10 having a melt flow index of 1.2 g/10 minutes.

Another compatible thermoplastic rubber outer layer and thermoplastic inner layer material combinations includes a hydrogenated adduct of a styrene-butadiene block copolymer with maleic anhydride, such as Craton sold by Shell Chemical Company of Houston, Tex., and a polyvinyl chloride.

Figure 4:
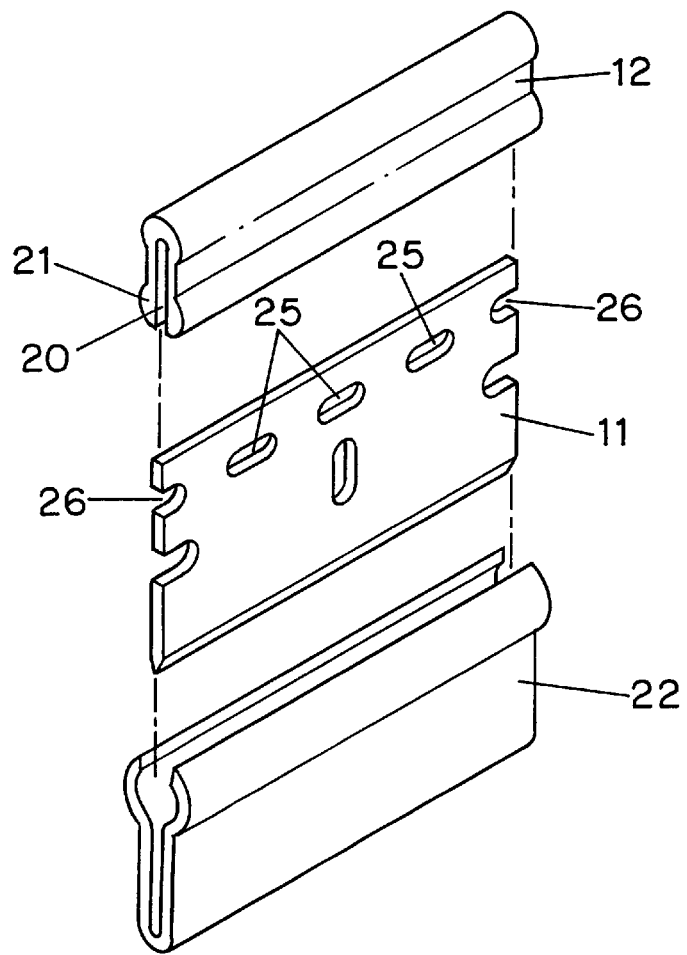
FIG. 4 is an exploded isometric view of the exemplary safety razor blade tool of FIG. 2 and a blade sheath.
Figure 5:
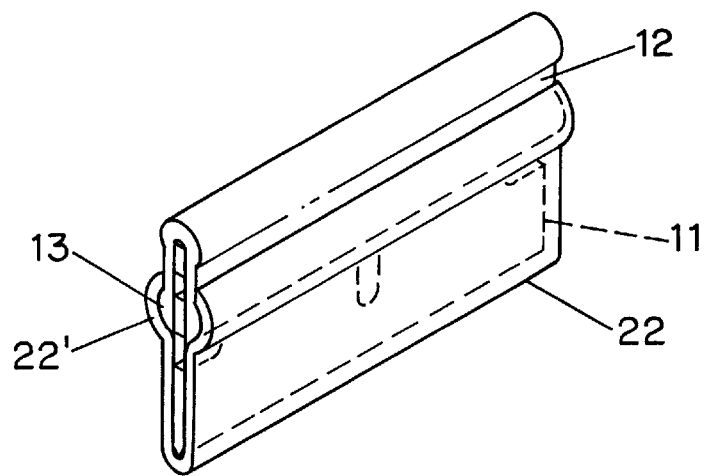
FIG. 5 is an isometric view of the exemplary safety razor blade tool of FIG. 2 with the attached blade sheath of FIG. 4.

Turning now to FIGS. 4 and 5, a separate blade sheath 22 may also be provided. The blade sheath 22 substantially covers at least the cutting edge of the blade 11, if not the entire blade 11. In the exemplary embodiment, the blade sheath 22 covers the entire blade 11 and has longitudinal cylindrical concavities 22' that engage the longitudinal beads 13 of the attached protective cover 12 for the non-cutting edge of the blade 11. A user can then pull or slide off the blade sheath 22 from the protective cover 12. In this manner, the blade sheath 22 allows for greater safety in storage and disposal of the safety razor blade tool.

Suitable thermoplastic materials for forming the blade sheath 22 include polyolefins (such as high density polyethylene and polypropylene), polyvinyl chloride, acrylic and styrene-butadiene. Preferably, the blade sheath 22 is formed from an extruded 50%/50% mixture of transparent polystyrene and styrene-butadiene.

Turning now to FIG. 3, there is shown a block diagram schematically illustrating the process for fabricating the safety razor blade tool of the present invention. Separate conventional extruders 31 and 32 are respectively used to simultaneously extrude the thermoplastic of the rigid inner layer 20 and the compatible thermoplastic rubber of the outer layer 21 of the protective cover 12 for the non-cutting edge of the blade. The outputs of the extruders 31 and 32 are provided to a dual input substantially "U" shaped die set made using conventional techniques. The parameters of the extrusion depend upon the materials selected for the rigid thermoplastic inner layer and the thermoplastic rubber outer layer, and are known or readily determinable by those skilled in the art. For example, when coextruding a Stamylan inner layer and a Sarlink outer layer, the Stamylan is extruded at a temperature of approximately 375° F. and a pressure of approximately 1500 psi, while the Sarlink is extruded at a temperature of approximately 350° F. and a pressure of approximately 2000 psi.

The "U" shaped coextrusion die set 33 is separately heated to a temperature of approximately 350° F. The coextrudate exiting from the die set 33 is first cooled and optimally dimensioned in a first water tank 34 which is under vacuum, such as a Conair Gatto DPC Vacuum Tank. Contained within vacuum water tank 34 is an in-line sizing die 34a which confers the final dimensions to the coextrudate. If required, the coextrudate can be further cooled in a second water tank 35, such as a Conair Gatto Water Tank, at atmospheric pressure.

In the vacuum water tank 34, the air pressure above the cooling water in the tank forces the coextrudate against the walls of the sizing die 34a as it passes through the tank. A commercially available friction puller 36, such as the Conair Gatto Cat-A-Puller Model 205-4, moves the coextrudate through a heater 37 to soften the coextrudate for optimal cutting performance and subsequently through a cutter 38 of known design, such as Conair Gatto Cutter. The cutter 38 cuts the length of the softened coextrudate moving therethrough to a segment of a preset length, which is substantially equal to the length of the non-cutting edge 18 of the blade 11. In this manner, a rubberized protective cover 12 for the safety razor blade tool 10 is formed by a simple, low-cost coextrusion process.

The segment of the coextrudate is then fitted over the non-cutting edge of the blade so as to substantially cover the non-cutting edge. The segment is then fixedly attached to the blade 11 by heating the blade using an induction furnace (not shown), such as the Steremat Electowarme Model Eldec HFG10 RF generator and matching RF coil. Advantageously, the blade 11 has several holes and two notches in the area contacted by the protective cover 12. By heating the blade, the thermoplastic inner layer 20 is partially melted to allow it to flow through the holes 25 and the notches 26. When the thermoplastic inner layer 20 is allowed to harden in place, it bonds to itself through the holes 25 and the notches 26, forming a strong attachment to the blade 11.

While the invention has been described in terms of the foregoing specific embodiment thereof, it will be apparent to those skilled in the art that various alterations and modifications may be made to the described embodiment without departing from the scope of the invention, as defined by the appended claims. For example, providing a protective cover consisting of a single rigid thermoplastic layer having a surface with resilient, slip-resistant characteristics is an alternative, even though a coextruded, two-layer rubberized protective cover for the non-cutting edge of the blade is preferred.

I claim:
1. A safety razor blade tool, comprising:
   a substantially rectangular, single-edged safety razor blade having a cutting edge and an opposing non-cutting edge; and
   a thermoplastic protective cover fixedly attached to said non-cutting edge, the protective cover comprising an extruded substantially rigid inner layer of thermoplastic material and a rubberizing outer layer covering the rigid inner layer, the outer layer comprising a compatible thermoplastic rubber coextruded with the rigid inner layer, said protective cover being substantially coextensive with the length of the non-cutting edge of the blade and having a resilient, slip-resistant surface.

2. The safety razor blade tool of claim 1, wherein the thermoplastic rigid inner layer comprises a polyolefin and the thermoplastic rubber comprises ethylene-propylene-diene monomer rubber.

3. The safety razor blade tool of claim 2, wherein said polyolefin is polypropylene.

4. The safety razor blade tool of claim 1, wherein the thermoplastic rigid inner layer comprises a polyvinyl chloride and the thermoplastic rubber comprises a hydrogenated adduct of a styrene-butadiene block copolymer with maleic anhydride.

5. The safety razor blade of claim 1, wherein said thermoplastic protective cover further comprises
  a tie layer disposed between said rigid inner layer and said rubberizing outer layer.

6. In a safety razor blade tool including a substantially rectangular, single-edged safety razor blade having a cutting edge and an opposing non-cutting edge, and a thermoplastic protective cover fixedly attached to said non-cutting edge, said protective cover being substantially coextensive with the length of the non-cutting edge of the blade and having a resilient, slip-resistant surface, a method for producing the safety razor blade tool comprising the steps of:
  feeding a substantially rigid thermoplastic in a viscous state to a coextrusion die;
  simultaneously feeding a thermoplastic rubber compatible with the substantially rigid thermoplastic in a viscous state to the coextrusion die;
  coextruding the substantially rigid thermoplastic and the compatible thermoplastic rubber to form a protective cover having an inner layer of the substantially rigid thermoplastic and an outer layer of the compatible thermoplastic cover; and
  fixedly attaching said protective cover to the non-cutting edge of said safety razor blade.

7. The method of claim 6 wherein the step of feeding the substantially rigid thermoplastic in a viscous state includes extruding the substantially rigid thermoplastic, and the step of simultaneously feeding the thermoplastic rubber in a viscous state includes extruding the thermoplastic rubber.

8. The method of claim 7 wherein said substantially rigid thermoplastic is extruded at a temperature of approximately 375° F. and a pressure of approximately 1500 psi, and said thermoplastic rubber is extruded at a temperature of approximately 350° F. and a pressure of approximately 2000 psi.

9. The method of claim 8 wherein said coextrusion die is heated to a temperature of approximately 350° F.

10. The method of claim 6 wherein the blade has at least one hole in the region contacted by the protective cover for the non-cutting edge, and the attaching step includes heating said safety razor blade by induction heating so that the protective cover partially melts and flow through the at least one hole and bonds through the at least one hole when cooled.

11. The method of claim 6 wherein the protective cover forming step further comprises the steps of:
  feeding a substantially rigid thermoplastic in a viscous state to a coextrusion die;
  simultaneously feeding a thermoplastic rubber in a viscous state to said coextrusion die;
  simultaneously feeding a thermoplastic compatible with said substantially rigid thermoplastic and said thermoplastic rubber in a viscous state to said coextrusion die; and
  coextruding said substantially rigid thermoplastic, said compatible thermoplastic and said thermoplastic rubber to form said protective cover having an inner layer of said substantially rigid thermoplastic, a tie layer of said compatible thermoplastic and an outer layer of said thermoplastic rubber.

12. The method of claim 11 wherein the step of feeding the substantially rigid thermoplastic in a viscous state includes extruding the substantially rigid thermoplastic, the step of feeding the compatible thermoplastic in a viscous state includes extruding the compatible thermoplastic, and the step of simultaneously feeding the thermoplastic rubber in a viscous state includes extruding the thermoplastic rubber.

* * * * *